United States Patent
Ito et al.

(10) Patent No.: US 7,871,212 B2
(45) Date of Patent: Jan. 18, 2011

(54) LABEL PRODUCING APPARATUS AND LABEL PRODUCING SYSTEM

(75) Inventors: Akira Ito, Ashiya (JP); Tsuyoshi Ohashi, Hashima (JP); Kazunari Taki, Nagoya (JP); Osamu Nishikawa, Toyoake (JP); Shiro Yamada, Kasugai (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 695 days.

(21) Appl. No.: 11/897,039

(22) Filed: Aug. 29, 2007

(65) Prior Publication Data

US 2008/0063452 A1 Mar. 13, 2008

(30) Foreign Application Priority Data

Sep. 1, 2006 (JP) ............................. 2006-238141

(51) Int. Cl.
  *B41J 11/44* (2006.01)
(52) U.S. Cl. ............................. 400/76; 400/70; 400/62; 400/311; 101/35
(58) Field of Classification Search ................. 400/76, 400/611, 103, 70, 61, 62; 101/35
  See application file for complete search history.

(56) References Cited

U.S. PATENT DOCUMENTS

| | | | | |
|---|---|---|---|---|
| 6,246,326 | B1 * | 6/2001 | Wiklof et al. | 340/572.1 |
| 6,327,972 | B2 * | 12/2001 | Heredia et al. | 101/35 |
| 6,899,476 | B1 * | 5/2005 | Barrus et al. | 400/76 |
| 7,114,654 | B2 * | 10/2006 | Chapman et al. | 235/462.01 |
| 2007/0145134 | A1 | 6/2007 | Ichikawa | |

FOREIGN PATENT DOCUMENTS

| | | |
|---|---|---|
| JP | 2004155150 | 6/2004 |
| WO | WO 02/35463 A2 | 5/2002 |
| WO | WO 02/35463 A3 | 5/2002 |
| WO | WO 2006/016594 A1 | 2/2006 |

* cited by examiner

*Primary Examiner*—Ren Yan
*Assistant Examiner*—Matthew G Marini
(74) *Attorney, Agent, or Firm*—Day Pitney LLP

(57) ABSTRACT

A label producing apparatus has a pressure roller drive shaft for feeding a cover film supplied from a cartridge storing a cover film capable of supply, acquires the arrangement information by accessing a database storing and holding arrangement information of the article to be arranged, and has a print head and a cutter for producing an auxiliary label by forming the acquired arrangement information for the cover film fed by the pressure roller drive shaft.

11 Claims, 14 Drawing Sheets

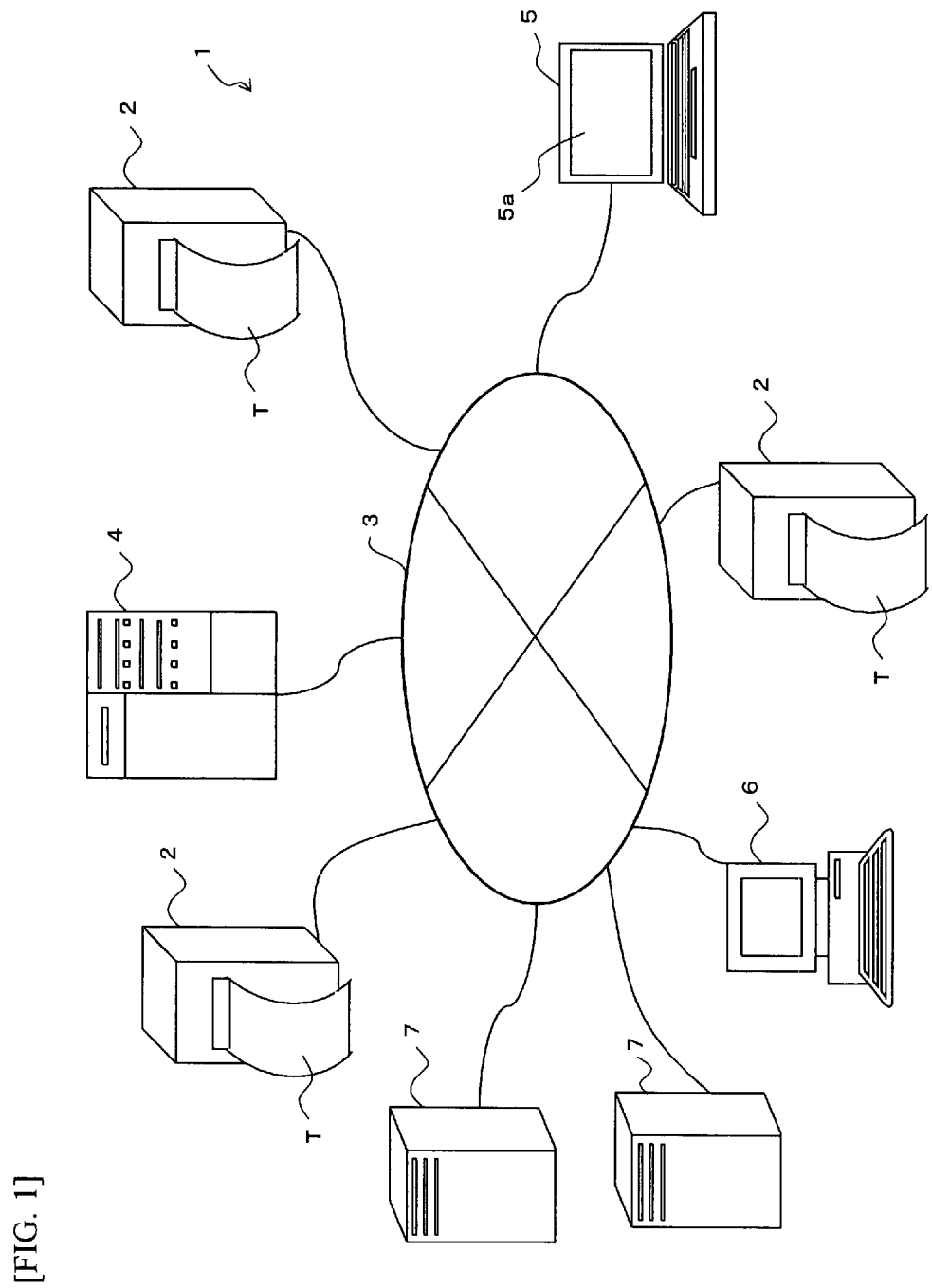
[FIG. 1]

[FIG. 2]
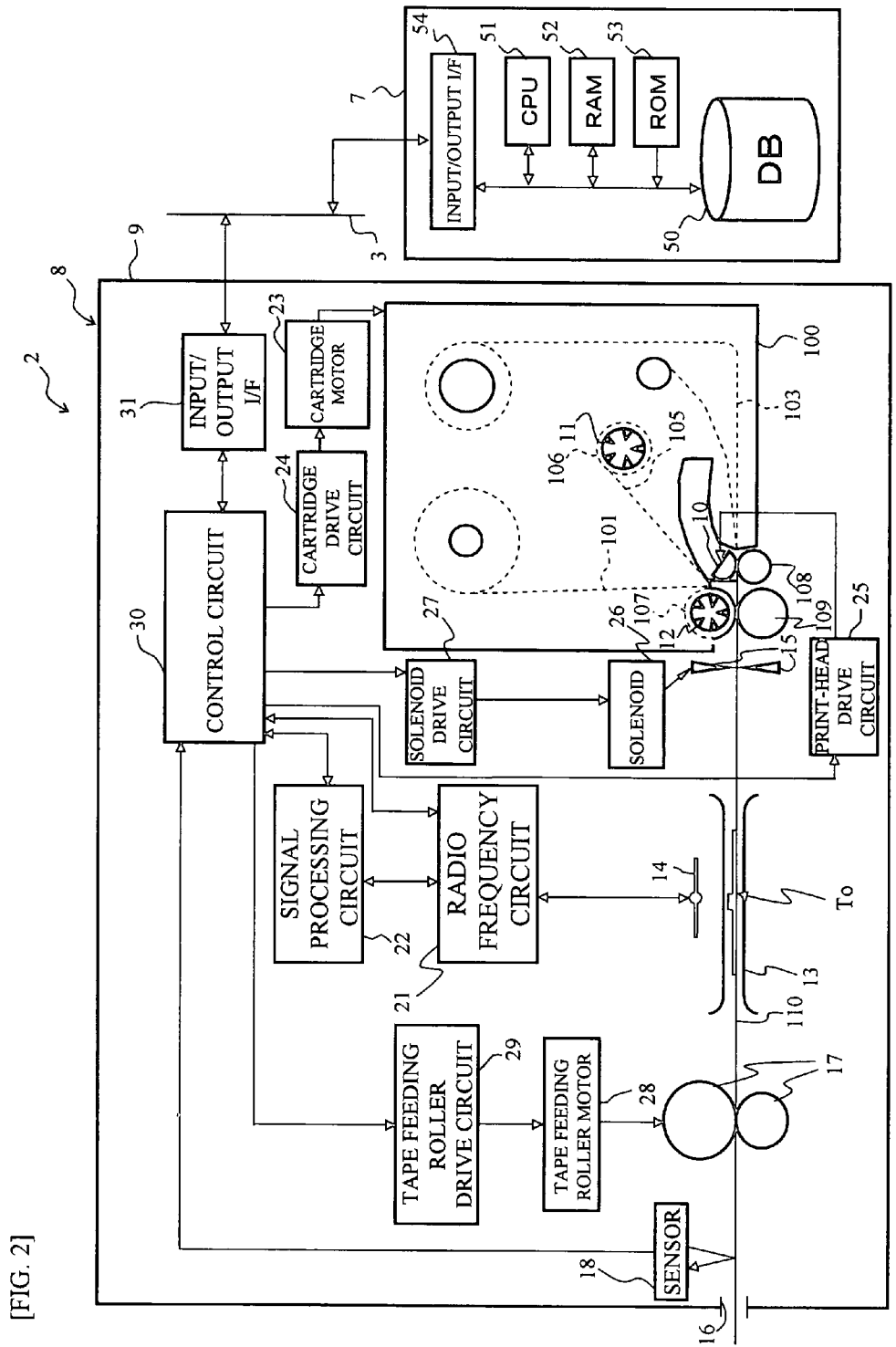

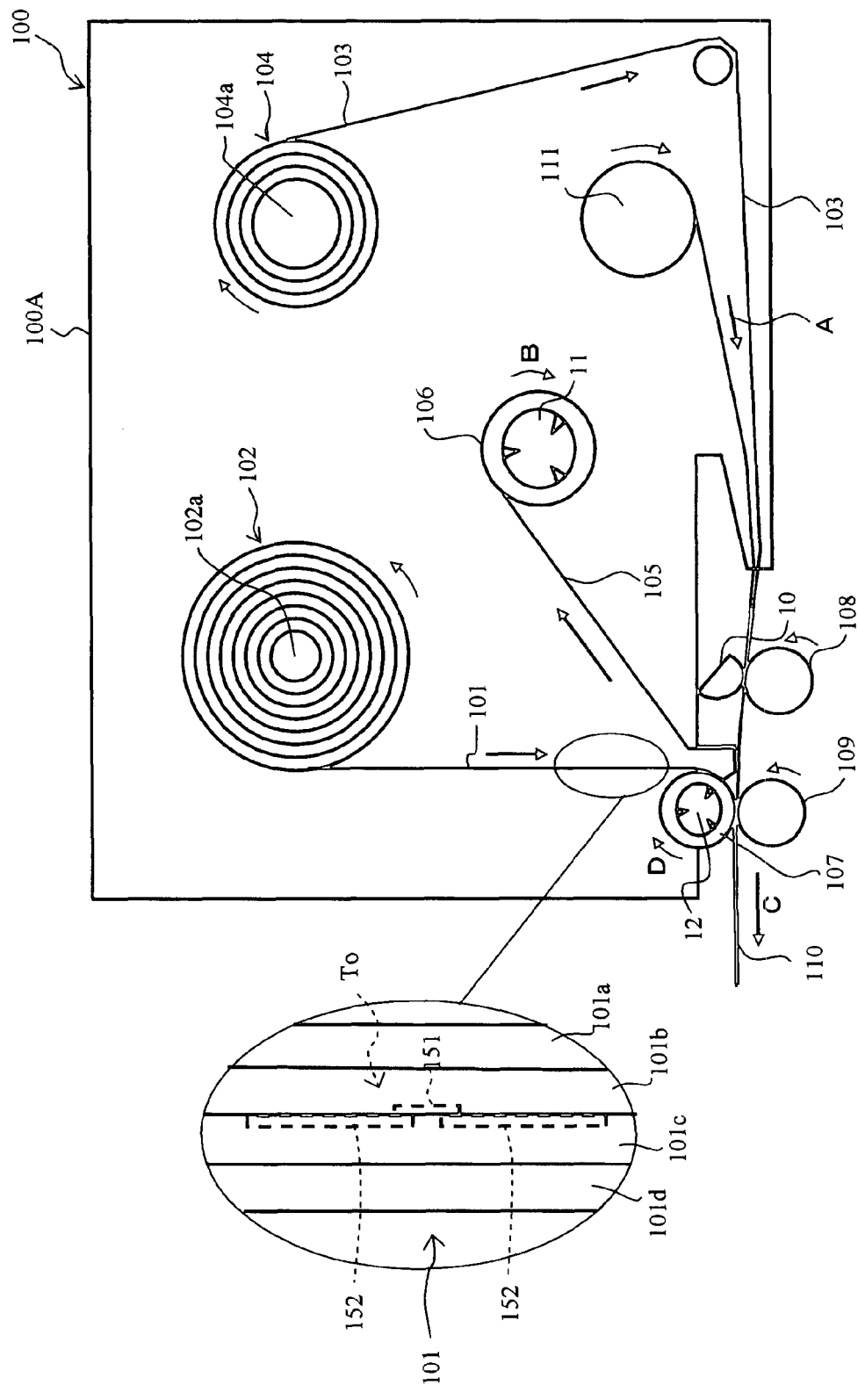
[FIG. 3]

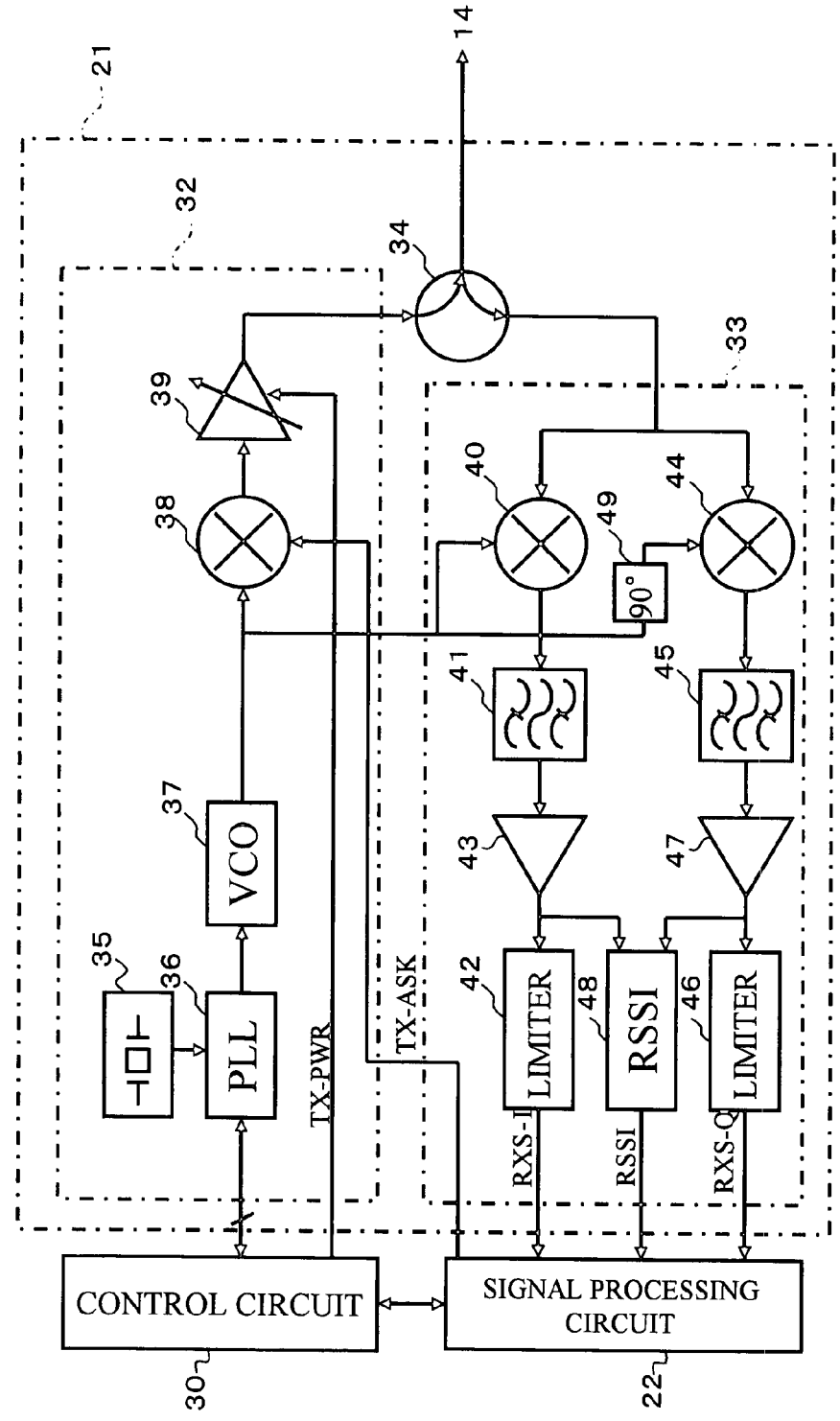
[FIG. 4]

[FIG. 5]
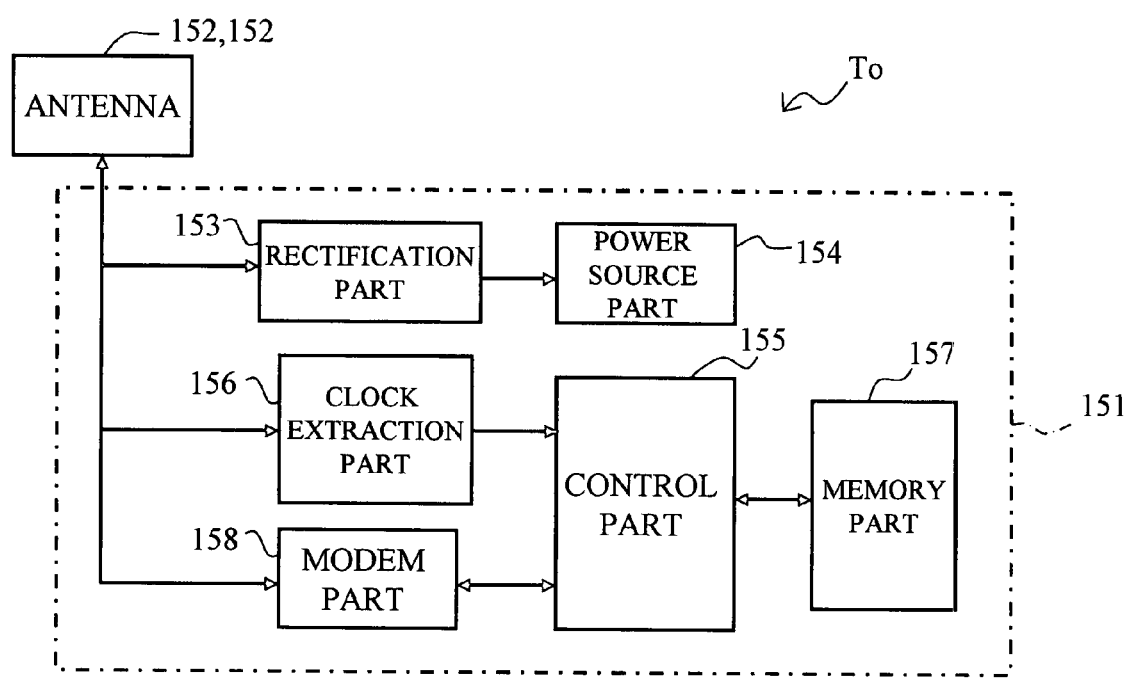

[FIG. 6A]
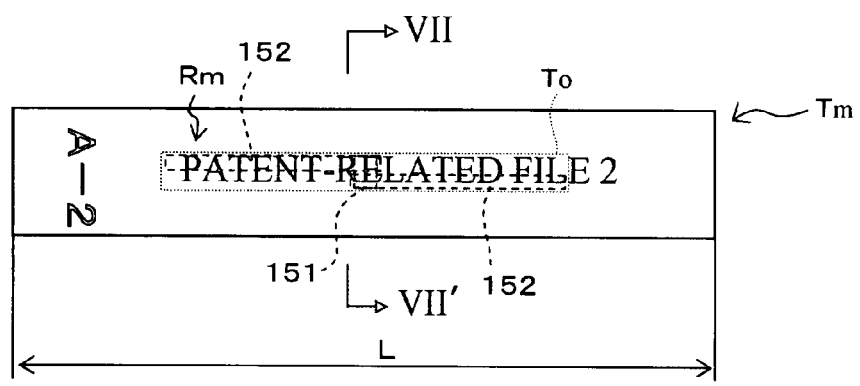
[FIG. 6B]
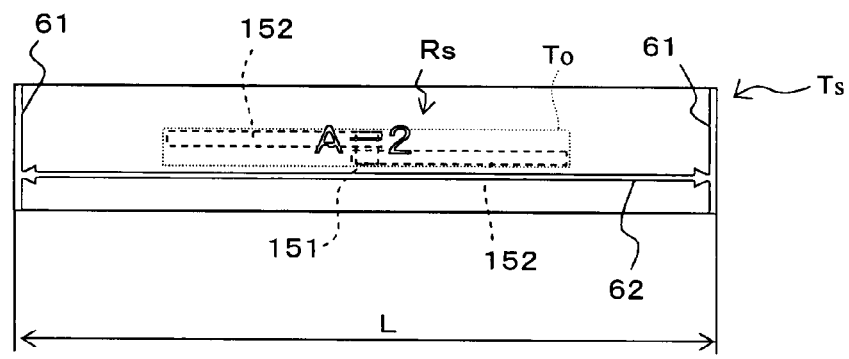
[FIG. 6C]
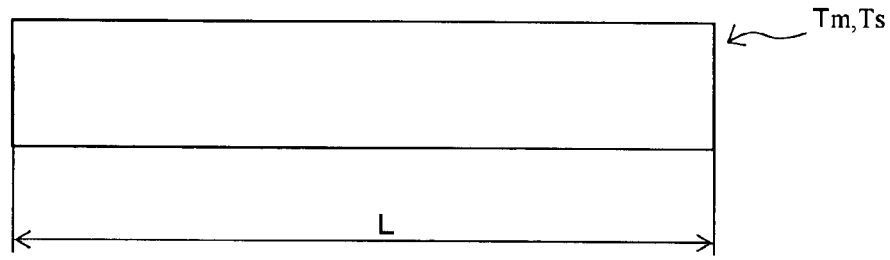

[FIG. 7]
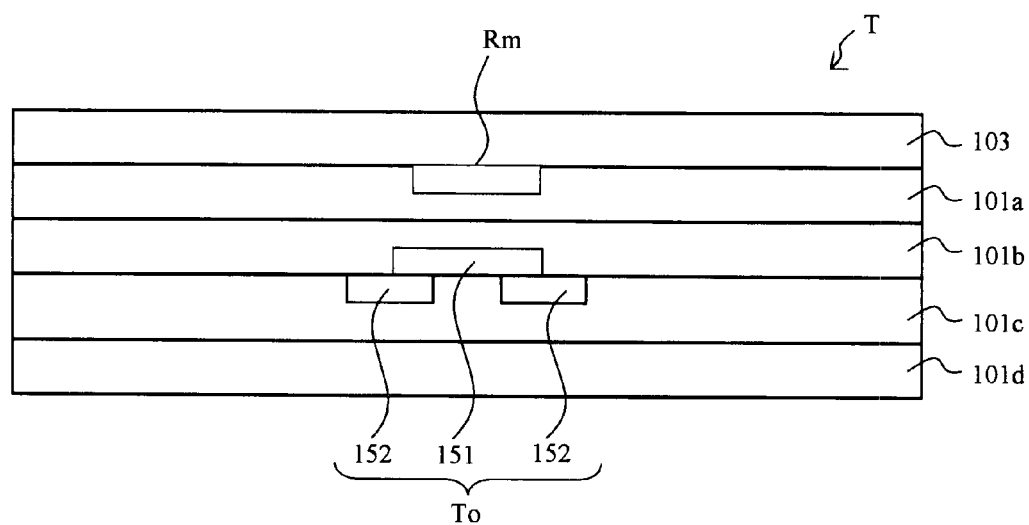

[FIG. 8]
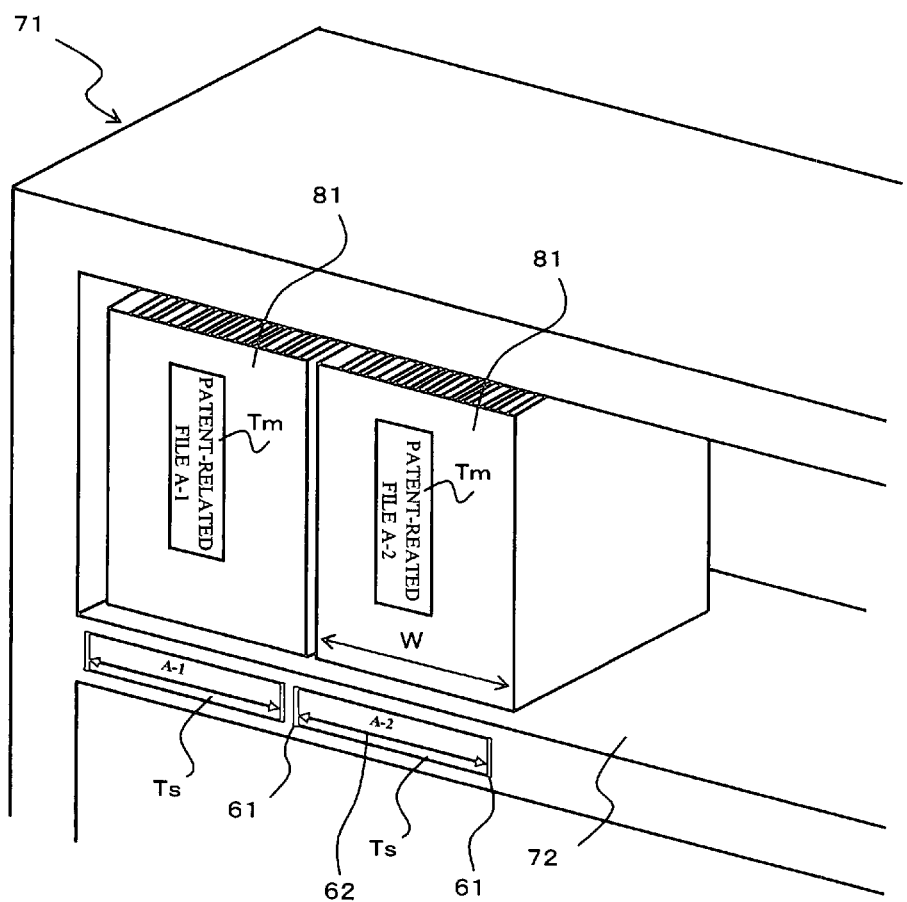

[FIG. 9]
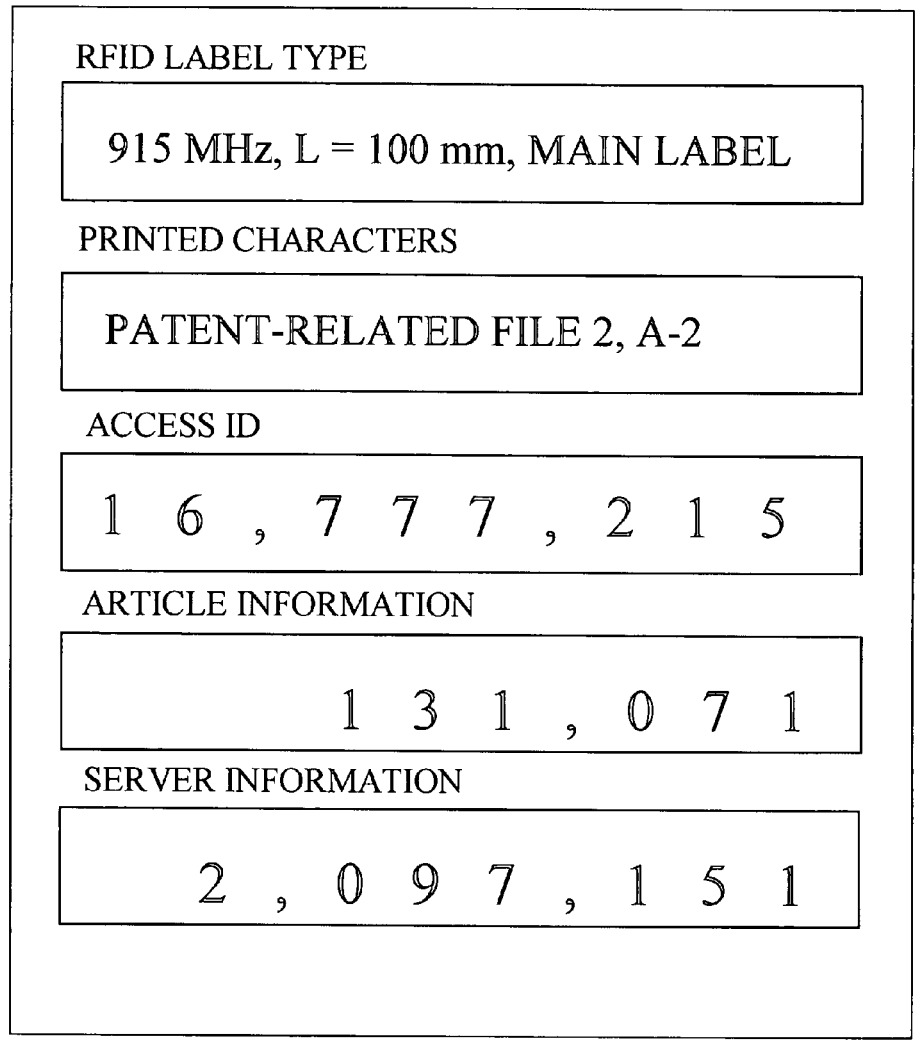

[FIG. 10]

ARTICLE TO BE ORGANIZED INFORMATION TABLE

| FILE ID | FILE NAME | DATE OF CREATION | CREATED BY | DISCLOSURE OR NOT | PLACE FOR ORGANIZATION |
|---|---|---|---|---|---|
| F0001 | PATENT-RELATED FILE 1 | 20060401 | YAMAMOTO | CONFIDENTIAL | A-1 |
| F0002 | PATENT-RELATED FILE 2 | 20060801 | TANAKA | CONFIDENTIAL | A-2 |
| ... | ... | ... | ... | ... | ... |

[FIG. 11]

ORGANIZATION INFORMATION TABLE (FOR BOOKSHELF)

| SHELF | ENTIRE LENGTH | NUMBER OF FILES | FILE ID | WIDTH TOTAL LENGTH | AVAILABLE LENGTH |
|---|---|---|---|---|---|
| A | 100cm | 2 | F0001, F0002 | 14cm | 86cm |
| B | 100cm | 0 | — | — | — |
| C | 100cm | 0 | — | — | — |

[FIG. 12]
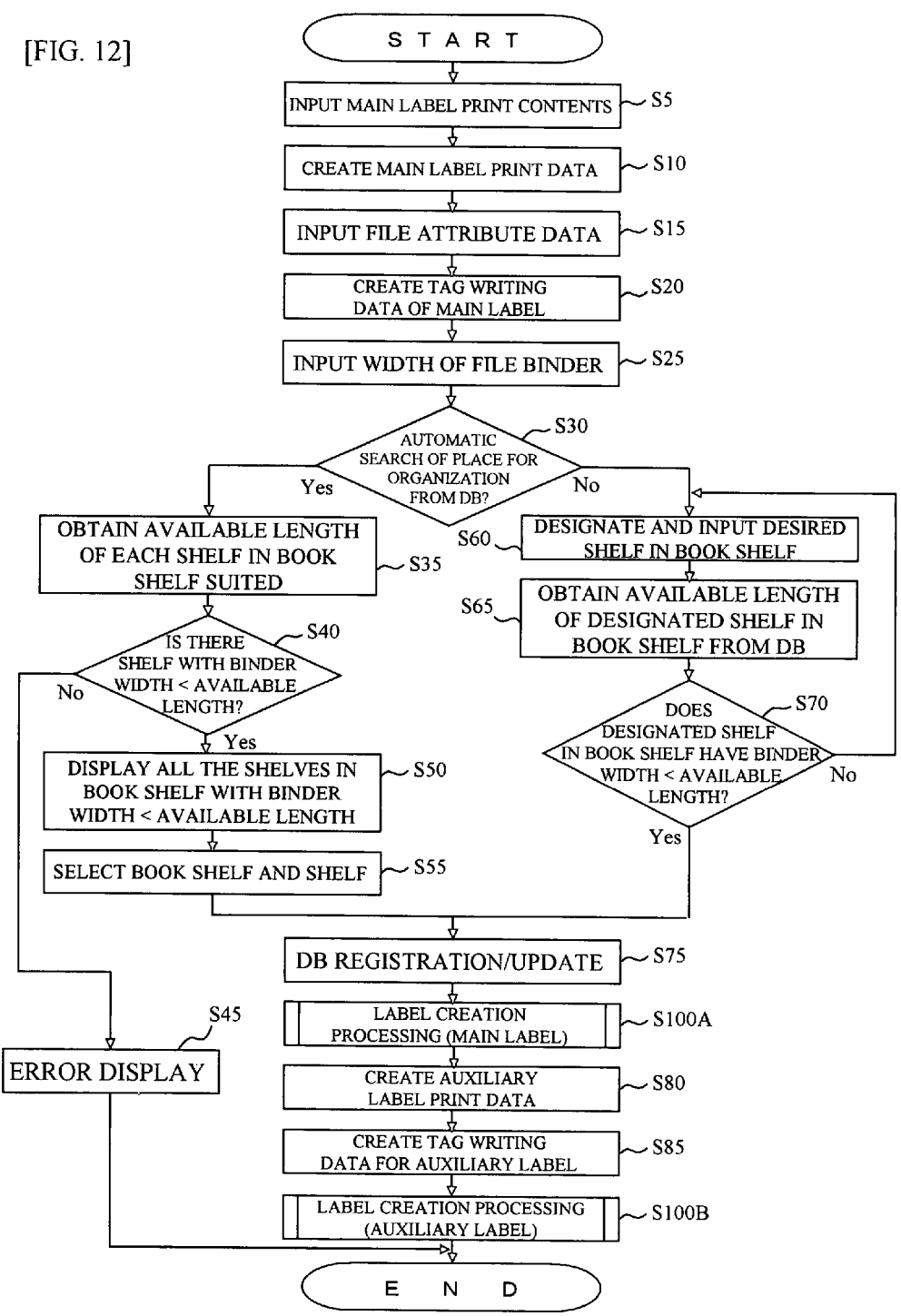

[FIG. 13]
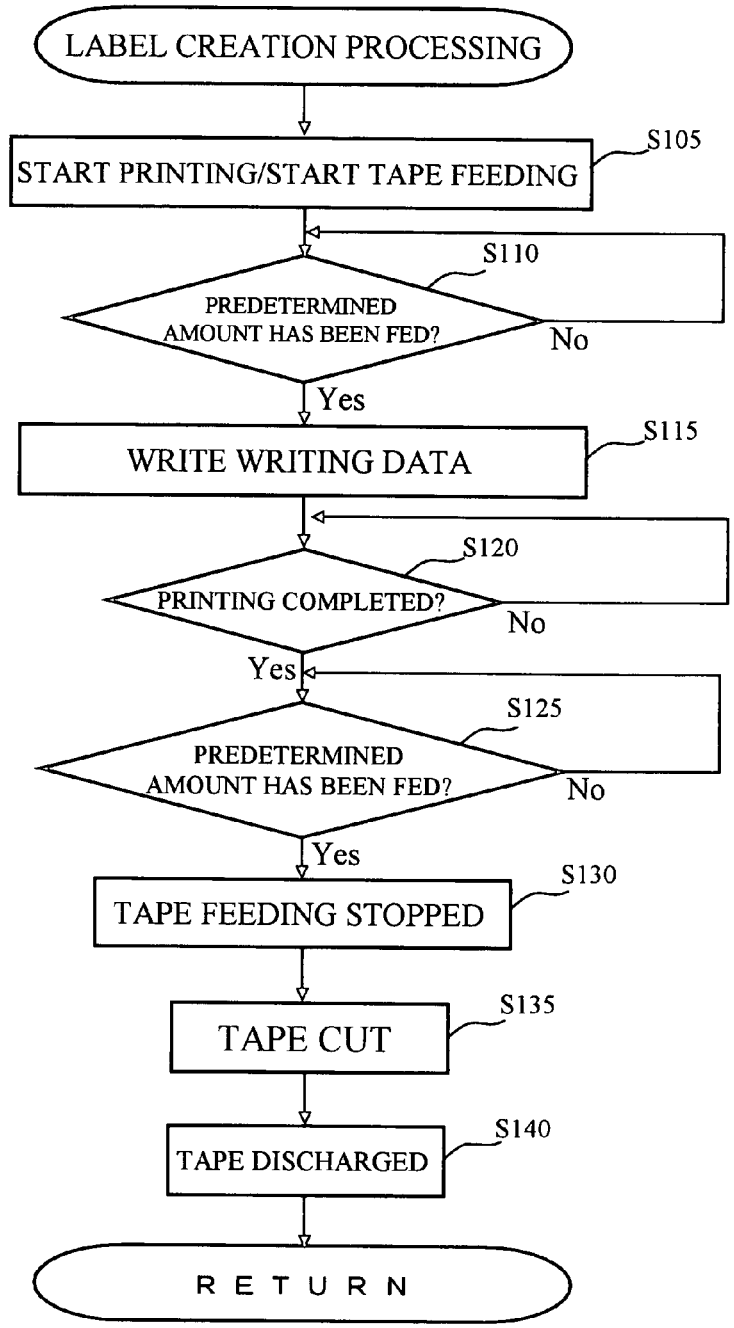

[FIG. 14]
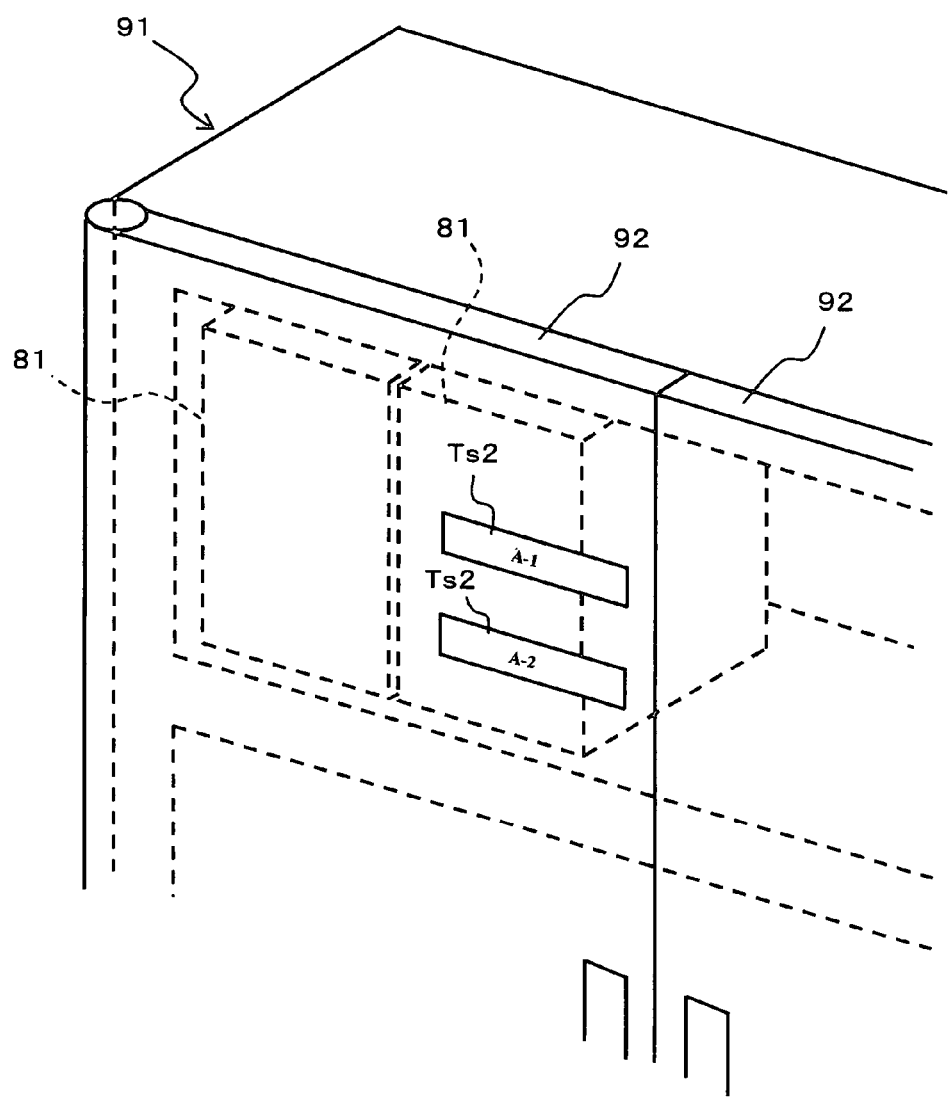

LABEL PRODUCING APPARATUS AND LABEL PRODUCING SYSTEM

CROSS-REFERENCE TO RELATED APPLICATIONS

This application claims priority from JP 2006-238141, filed Sep. 1, 2006, the contents of which are hereby incorporated by reference.

BACKGROUND

1. Field

The present disclosure relates to a label producing apparatus and a label producing system for forming predetermined information on a label base and producing a label which can be affixed to an article or the like.

2. Description of the Related Art

A tape printing device (label producing apparatus) has been already proposed (JP,A, 2004-155150, for example), in which a tape to be a print-receiving material is housed in a cartridge (tape cassette) in a roll state and the tape is fed out of the roll, printed with desired characters and discharged in a label state.

In this prior art, a roll around which a base tape provided with a separation sheet (double-sided adhesive tape) is wound and a roll around which a print-receiving tape to be bonded to the base tape (film tape) is wound are provided, the base tape and the print-receiving tape are fed out respectively from the two rolls while the print-receiving tape is printed with predetermined print, the print-receiving tape with print and the base tape are bonded together so as to have a label tape with print, and the label tape with print is cut by cutter to a predetermined length to produce a label.

Various usages can be considered for the label produced using the above prior art label producing apparatus. For article management, for example, a label on which an arrangement (storage) place for articles is printed is produced and the label is affixed to an article to be arranged for easy arrangement.

However, in this case, the actual state of the arrangement place is not particularly checked before the label production and there is a possibility that even if a label is produced by designating an arrangement place for an article to be arranged and affixed, the place is filled with articles at actual arrangement and is not capable of storage or even though the place has an empty space, the dimension of the article to be arranged does not fit in the place for storage or the article to be arranged does not conform to the arrangement place. Therefore, there is a fear that the article to be arranged can not be managed accurately and efficiently.

SUMMARY

An object of the present disclosure is to provide a label producing apparatus and a label producing system which can manage articles to be arranged accurately and efficiently.

In order to achieve the above object, a first aspect is a label producing apparatus comprising: a feeding device that feeds a label base supplied from a label base housing body for housing the label base capable of supply; an arrangement information acquisition portion that accesses a database storing and holding arrangement information of an article to be arranged and acquires the arrangement information; and an information forming device that forms the arrangement information acquired by the arrangement information acquisition portion for the label base fed by the feeding device so as to produce an label for arrangement information.

In the first aspect of the present application, the arrangement information of the article to be arranged is written into the database as above, and the label for arrangement information is produced based on the access to the database. With this arrangement, for example, a label can be produced after presence of an empty space in the arrangement place and conformance/nonconformance to the article to be arranged are checked and detailed correspondence between the article to be arranged and its arrangement place or the like is clarified. As a result, the article to be arranged can be managed accurately and efficiently.

In order to achieve the above object, a second aspect is A label producing apparatus comprising: a feeding device that feeds a tag medium provided with an RFID circuit element having an IC circuit part for storing information and an antenna for transmitting/receiving information as a label base; an arrangement information acquisition portion that accesses a database storing and holding arrangement information of an article to be arranged and acquires the arrangement information; an information forming device that forms said arrangement information acquired by said arrangement information acquisition portion for said tag medium fed by said feeding device so as to produce an label for arrangement information; a printing device for an article to be arranged that prints identification information of said article to be arranged relating to said arrangement information acquired by said arrangement information acquisition portion on said tag medium or a print-receiving medium to be bonded thereto and produces a label for an article to be arranged handled in relation with said article to be arranged; a communicating device that performs transmitting/receiving information with said RFID circuit element via wireless communication; and a first writing controller that writes first information relating to said article to be arranged in said IC circuit part via the communicating device and produces an RFID label for an article to be arranged provided with said first information as said label for an article to be arranged.

By reading the first information written in the IC circuit part of the RFID circuit element of the RFID label for an article to be arranged by an RFID tag information reading device and acquiring identification information of the article to be arranged in the end, the article to be arranged can be managed using an RFID tag information system.

In order to achieve the above object, a third aspect is a label producing system comprising: an information processing device that reads and writes information to and from a database storing and holding arrangement information of an article to be arranged; and a label producing apparatus including: a feeding device that feeds a label base supplied from a label base housing body for housing the label base capable of supply; an arrangement information acquisition portion that accesses the database to acquire the arrangement information; and an information forming device that forms the arrangement information acquired by the arrangement information acquisition portion for the label base fed by the feeding device and produces an label for arrangement information, the label producing system wherein: at least one of the information processing device or the label producing apparatus includes a update processing portion that performs update processing of the arrangement information of the database according to the production of the label for arrangement information by the information forming device.

With this arrangement, the arrangement information of the article to be arranged changed by the production of the label for arrangement information can be updated to the latest, accuracy of the information can be surely maintained, and the article to be arranged can be managed accurately and efficiently.

BRIEF DESCRIPTION OF THE DRAWINGS

FIG. 1 is a system configuration illustrating an RFID tag manufacturing system to which a label producing apparatus of an embodiment of the present disclosure is applied.

FIG. 2 is a conceptual block diagram illustrating a detailed structure of the label producing apparatus.

FIG. 3 is an explanatory view for illustrating a detailed structure of a cartridge provided with a base tape on which an RFID circuit element is formed.

FIG. 4 is a functional block diagram illustrating a detailed function of a radio frequency circuit.

FIG. 5 is a functional block diagram illustrating a functional configuration of the RFID circuit element.

FIGS. 6A to 6C are a top view and a bottom view illustrating an example of an appearance of a main label and an auxiliary label provided with the RFID circuit element.

FIG. 7 is a cross sectional diagram by VII-VII' section in FIG. 6A.

FIG. 8 is a view illustrating a use example of the main label and auxiliary label of the print example shown in FIGS. 6A and 6B.

FIG. 9 is a view illustrating an example of a screen displayed on a terminal or a general-purpose computer at an access to RFID tag information.

FIG. 10 is a diagram conceptually illustrating an example of an article to be arranged information table to be stored in a database.

FIG. 11 is a diagram conceptually illustrating an example of an arrangement information table to be stored in the database.

FIG. 12 is a flowchart illustrating a control procedure executed by a control circuit of the label producing apparatus.

FIG. 13 is a flowchart illustrating a detailed procedure of the label producing apparatus executed by the control circuit of the label producing apparatus at Step S100A and Step S100B in FIG. 12.

FIG. 14 is a view illustrating a use example of a second auxiliary label.

DETAILED DESCRIPTION OF THE PREFERRED EMBODIMENTS

An embodiment of the present disclosure will be described referring to the attached drawings.

FIG. 1 is a system configuration illustrating an RFID tag manufacturing system to which a label producing apparatus of the present embodiment is applied. In the present embodiment, an example will be described that a file binder for collectively keeping documents is used as an article to be arranged and the present disclosure is applied to production of an RFID label to be used for arrangement of this article to be arranged.

In an RFID tag manufacturing system 1 shown in FIG. 1, a label producing apparatus 2 by the present embodiment is connected to a route server 4, a terminal 5, a general-purpose computer 6, and a plurality of information servers 7 via a wired or wireless communication line 3.

FIG. 2 is a conceptual block diagram illustrating a detailed structure of the label producing apparatus 2 and the information server 7.

In FIG. 2, at a main body 8 of the label producing apparatus 2, a cartridge holder portion (not shown) as a recess is provided, and at this holder portion, a cartridge 100 is detachably attached.

The main body 8 is provided with the cartridge holder portion in which the cartridge 100 is fitted and has a housing 9 constituting a profile, a print head 10 that applies predetermined print (printing) on a cover film 103, a ribbon take-up roller drive shaft 11 for driving an ink ribbon 105 which has finished printing on the cover film 103, a pressure roller drive shaft 12 for bonding the cover film 103 and a base tape 101 together and feeding them as a tag label tape 110 with print from the cartridge 100, a device antenna 14 for transmitting/receiving a signal via wireless communication with an RFID circuit element To (whose detail will be described later) provided at the tag label tape 110 with print, a cutter 15 for cutting the tag label tape 110 with print to a predetermined length at a predetermined timing and generating an RFID label T (whose detail will be described later) in a label state, a pair of feeding guides 13 for setting and holding the RFID circuit element To in a predetermined access area opposed to the device antenna 14 at transmitting/receiving the signal via the wireless communication and guiding the tape 110 after cutting (=RFID label T), a feeding roller 17 for feeding and sending out the guided RFID label T to a carry-out exit 16, and a label end sensor 18 for detecting presence of the RFID label T at the carry-out exit 16.

On the other hand, the main body 8 has a radio frequency circuit 21 for accessing (for writing or reading) the RFID circuit element To via the device antenna 14, a signal processing circuit 22 for processing signals read out from the RFID circuit element To, a motor 23 to drive cartridge shaft for driving the above-mentioned ribbon take-up roller drive shaft 11 and the feeding roller drive shaft 12, a cartridge shaft drive circuit 24 for controlling the driving of the motor 23 to drive cartridge shaft, a print-head drive circuit 25 for controlling electricity to the print head 10, a solenoid 26 for driving the cutter 15 for the cutting operation, a solenoid drive circuit 27 for controlling the solenoid 26, a tape-feeding-roller motor 28 for driving the feeding roller 17, a tape-feeding-roller drive circuit 29 for controlling the tape-feeding-roller motor 28, and a control circuit 30 for controlling the entire operation of the label producing apparatus 2 via the radio frequency circuit 21, the signal processing circuit 22, the cartridge shaft drive circuit 24, the print-head drive circuit 25, the solenoid drive circuit 27, the tape-feeding-roller drive circuit 29 and the like.

The control circuit 30 is a so-called microcomputer. Though detailed description will be omitted, the control circuit 30 comprises a CPU, which is a central processing device, ROM, RAM and the like, and executes signal processing according to a program stored in the ROM in advance using a temporary storage function provided by the RAM. Furthermore, the control circuit 30 is connected to the communication line via an input/output interface 31, for example, so that information can be exchanged with the route server 4, the other terminals 5, the general-purpose computer 6, the information server 7 and the like connected to the communication line.

The information server 7 comprises a CPU 51 for control of each part, transfer of data, various calculation and the like, a RAM 52 for temporary data storage or the like, a ROM 53 storing control programs and the like, an input/output interface 54 for controlling data input/output with the label producing apparatus 2, the terminal 5, the general-purpose computer 6 and the like via the communication line 3 and the like, and a database (abbreviated as DB in figures) 50, which is a large capacity main memory device.

FIG. 3 is an explanatory view for illustrating a detailed structure of the cartridge 100. In FIG. 3, the cartridge 100 comprises a housing 100A, a first roll 102 disposed within the housing 100A and around which the band-state base tape 101 is wound, a second roll 104 around which the transparent cover film 103 with substantially the same width as the base tape 101 is wound, a ribbon-supply-side roll 111 for supplying the ink ribbon 105 (thermal transfer ribbon, however, it is not needed when the cover film is a thermo-sensitive tape), the ribbon take-up roller 106 for taking up the ribbon 105 after printing, and a pressure roller 107 for pressing and bonding the base tape 101 and the cover film 103 to each other so as to form the tag label tape 110 with print while feeding the tape in the direction of the arrow A (=functioning also as a feeding roller).

The first roll 102 has the base tape 101 on which a plurality of RFID circuit elements To is sequentially formed with an equal interval in the longitudinal direction wound around a reel member 102a. The interval with which the RFID circuit elements To are formed is the same as the width of a file binder, which is a target for use of a label to be produced by the label producing apparatus 2, and if there are several file binder widths according to standard, there is also a plurality of types of the cartridges 100 prepared corresponding to each standard of the file binder widths so that they can be exchanged as appropriate (which will be described later).

The base tape 101 is basically in a four-layered structure (except the RFID circuit element To and its vicinity) (See the partially enlarged view in FIG. 3) and is configured in lamination in the order of an adhesive layer 101a made of an appropriate adhesive, a colored base film 101b made of polyethylene terephthalate (PET) and the like, an adhesive layer 101c made of an appropriate adhesive, and a separation sheet 101d from the side wound inside (right side in FIG. 3) toward the opposite side (left side in FIG. 3).

On the back side of the base film 101b (left side in FIG. 3), an antenna 152 (a dipole antenna in this example but other antennas such as a loop-coil antenna may be used) for transmitting/receiving information is provided, the IC circuit part 151 connected to it and storing information is formed, and the RFID circuit element To is comprised by them.

On the front side of the base film 101b (right side in FIG. 3), the adhesive layer 101a for affixing the cover film 103 later is formed, while on the back side of the base film 101b (left side in FIG. 3), the separation sheet 101d is affixed to the base film 101b by the adhesive layer 101c provided so as to include the RFID circuit element To. The separation sheet 101d enables adhesion to a predetermined article or the like by the adhesive layer 101c through separation of the separation sheet when the RFID label T finally completed in the label state is affixed (or attached, included or the like. It may be any form if being handled in relation) to the article.

The second roll 104 has the cover film 103 wound around a reel member 104a. In the cover film 103 fed out of the second roll 104, the ribbon 105 arranged on its back face side (that is, the side to be affixed to the base tape 101) and driven by the ribbon-supply-side roll 111 and the ribbon take-up roller 106 is brought into contact with the back face of the cover film 103 by being pressed by the print head 10.

The ribbon take-up roller 106 and the pressure roller 107 are rotated/driven in conjunction by a driving force of the motor 23 to drive cartridge shaft (See the above-mentioned FIG. 2), which is a pulse motor, for example, provided outside the cartridge 100, transmitted to the ribbon take-up roller drive shaft 11 and the feeding roller drive shaft 12.

In the cartridge 100 with the above configuration, the base tape 101 fed out of the first roll 102 is supplied to the pressure roller 107. On the other hand, as for the cover film 103 fed out of the second roll 104, the ink ribbon 105 arranged on its back face side (that is, the side affixed to the base tape 101) and driven by the ribbon-supply-side roll 111 and the ribbon take-up roller 106 is pressed by the print head 10 and brought into contact with the back face of the cover film 103.

When the cartridge 100 is attached to the cartridge holder portion of the main body 8 and the roll holder (not shown) is moved from the release position to the contact position, the cover film 103 and the ink ribbon 105 are held between the print head 10 and a platen roller 108, and the base tape 101 and the cover film 103 are held between the pressure roller 107 and a sub roller 109. And the ribbon take-up roller 106 and the pressure roller 107 are rotated and driven by the driving force of the motor 23 to drive cartridge shaft in a direction shown by an arrow B and an arrow D, respectively, in synchronization with each other. At this time, the feeding roller drive shaft 12, the sub roller 109 and the platen roller 108 are connected through a gear (not shown), and with the driving of the feeding roller drive shaft 12, the pressure roller 107, the sub roller 109, and the platen roller 108 are rotated, and the base tape 101 is fed out of the first roll 102 and supplied to the pressure roller 107 as mentioned above. On the other hand, the cover film 103 is fed out of the second roll 104, and a plurality of heater elements of the print head 10 is electrified by the print-head drive circuit 25. As a result, print Rm and print Rs (See FIG. 6, which will be described later) are printed on the back face of the cover film 103. Then, the base tape 101 and the cover film 103 on which the printing has been finished are bonded together by the pressure roller 107 and the sub roller 109 to be integrated and formed as the tag label tape 110 with print and fed out of the cartridge 100. The ink ribbon 105 finished with printing on the cover film 103 is wound up by the ribbon take-up roller 106 by driving of the ribbon take-up roller drive shaft 11. In this operation, the base tape 101 and the cover film 103 are fed in the tape longitudinal direction, respectively, that is, the tape longitudinal direction becomes the same as the tape feeding direction.

FIG. 4 is a functional block diagram illustrating a detailed function of the radio frequency circuit 21. In FIG. 4, the radio frequency circuit 21 comprises a transmitting portion 32 for transmitting a signal to the RFID circuit elements To via the device antenna 14, a receiving portion 33 in which a reflected wave from the RFID circuit elements To received by the device antenna 14 is input, and a transmit-receive splitter 34.

The transmitting portion 32 includes a crystal oscillator 35 for generating a carrier wave for accessing (reading or writing) the RFID tag information stored in the IC circuit part 151 of the RFID circuit element To according to a control signal from the control circuit 30, a PLL (Phase Locked Loop) 36, a VCO (Voltage Controlled Oscillator) 37, a transmission multiplying circuit 38 (however, an amplitude factor variable amplifier or the like may be used in the case of amplitude modulation) for modulating (in this case, amplitude modulation according to a "TX_ASK" signal supplied from the signal processing circuit 22) the carrier wave generated as described above according to a signal supplied from the signal processing circuit 22, and a variable transmission amplifier 39 for amplifying the modulated waves modulated by the transmission multiplying circuit 38 with an amplification factor determined according to a "TX_PWR" signal supplied from the control circuit 30. The above generated carrier wave uses an appropriate frequency (UHF band, short-wave band, microwave band or the like), and an output of the transmission amplifier 39 is transmitted to the device antenna 14 via the transmit-receive splitter 34 and supplied to the IC circuit part 151 of the RFID circuit element To. The RFID tag information is not limited to the signals thus modulated but it may be only a plain carrier wave.

The receiving portion 33 includes a receiving first multiplying circuit 40 for multiplying for demodulation the reflected wave received from the RFID circuit element To through the device antenna 14 by the carrier wave generated as described above, a first bandpass filter 41 for extracting only the signals within the necessary band from the output of the receiving first multiplying circuit 40, a receiving first amplifier 43 for amplifying the output of the first bandpass filter 41, a first limiter 42 for further amplifying the output of the receiving first amplifier 43 and converting the output into a digital signal, a receiving second multiplying circuit 44 for multiplying the reflected wave received from the RFID circuit element To through the device antenna 14 by the carrier wave that have been delayed by a phase shifter 49 by 90° after having been generated as described above, a second bandpass filter 45 for extracting only the signals within the necessary band from the output signals of the receiving second multiplying circuit 44, a receiving second amplifier 47 for amplifying the output of the second bandpass filter 45, and a second limiter 46 for further amplifying the output of the receiving second amplifier 47 and converting the output into a digital signal. The signal "RXS-I" output from the first limiter 42 and the signal "RXS-Q" output from the second limiter 46 are input to the signal processing circuit 22 for processing.

Furthermore, the outputs from the receiving first amplifier 43 and the receiving second amplifier 47 are also input to an RSSI (Received Signal Strength Indicator) circuit 48, and the signal "RSSI" indicating the intensity of these signals is input to the signal processing circuit 22. As described above, the label producing apparatus 2 of this embodiment performs demodulation of the reflected wave from the RFID circuit element To by I-Q quadrature demodulation.

FIG. 5 is a functional block diagram illustrating a functional configuration of the RFID circuit element To. In FIG. 5, the RFID circuit element To has the tag antenna 152 for transmitting/receiving a signal contactlessly with the device antenna 14 using a high frequency such as the UHF band and the IC circuit part 151 connected to the tag antenna 152.

The IC circuit part 151 comprises a rectification part 153 for rectifying the carrier wave received by the tag antenna 152, a power source part 154 for accumulating energy of the carrier wave rectified by the rectification part 153 so as to make it a driving power supply of the IC circuit part 151, a clock extraction part 156 for extracting a clock signal from the carrier wave received by the tag antenna 152 and supplying it to a control unit 155, a memory part 157 which can store a predetermined information signal, a modem part 158 connected to the tag antenna 152, and the control unit 155 for controlling operation of the RFID circuit element To through the rectification part 153, the clock extraction part 156, the modem part 158 and the like.

The modem part 158 demodulates a communication signal from the device antenna 14 received by the tag antenna 152 and modulates the carrier wave received by the tag antenna 152 and resend it as a reflected wave from the tag antenna 152 based on a response signal from the control unit 155.

The control unit 155 interprets a received signal demodulated by the modem part 158, generates a reply signal based on the information signal stored in the memory part 157, and executes basic control such as control of reply by the modem part 158.

The clock extraction part 156 extracts a clock component from the received signal so as to extract a clock to the control unit 155 and supplies the clock corresponding to the velocity of the clock component of the received signal to the control unit 155.

FIGS. 6A, 6B, and 6C are views illustrating an example of an appearance of the RFID label T formed from the base tape 101 provided with the RFID circuit element To when information reading or writing of the RFID circuit element To and cutting of the tag label tape 110 with print have been completed as above. Here, the label producing apparatus 2 of the present embodiment can separately produce two types of labels, which are a main label Tm and an auxiliary label Ts as the RFID label T to be produced. A basic difference between the main label Tm and the auxiliary label Ts is only print contents Rm and Rs printed on the back face of the cover film 103 and contents of the tag information stored in the respective RFID circuit elements To (the contents of the tag information will be described later).

FIG. 6A is a top view of the main label Tm, FIG. 6B is a top view of the auxiliary label Ts, and FIG. 6C is a bottom view common to both the main label Tm and the auxiliary label Ts. FIG. 7 is a cross sectional view by VII-VII' section in FIG. 6A. The configuration shown by the cross sectional view in FIG. 7 is common to the main label Tm and the auxiliary label Ts in a portion other than the print Rm.

In FIGS. 6A, 6B, 6C and 7, the RFID label Tm, Ts (the collective name for the main label Tm and the auxiliary label Ts, the same applies to the following) includes a single RFID circuit element To and has a five-layered structure as shown in FIG. 7 in which the cover film 103 is added to the four-layered structure shown in FIG. 3, which are the cover film 103, the adhesive layer 101a, the base film 101b, the adhesive layer 10c, and the separation sheet 101d constituting the five layers from the side of the cover film 103 (upper side in FIG. 7) to the opposite side (lower side in FIG. 7). And as described above, the RFID circuit element To including the antenna 152 provided on the back side of the base film 101b is provided in the adhesive layer 101c, and the prints Rm, Rs are printed on the back face of the cover film 103.

The print Rm on the main label Tm is vertical writing toward the length direction in this example, and characters of "Patent-related file 2", which is one of the attribute data of the file binder to be affixed (file name) and "A-2" indicating the arrangement place are printed.

The print Rs of the auxiliary label Ts corresponding to the main label Tm is horizontal writing along the length direction in this example, and characters "A-2" indicating the arrangement place, a division line 61 drawn at both ends of the auxiliary label Ts and an arrow straight line 62 with an arrow head at both ends between the division lines 61 are printed.

The main label Tm and the auxiliary label Ts are both formed with the length L equal to an installation interval (pitch) of the RFID circuit element To in the base tape 101 in this example.

FIG. 8 is a view illustrating a use example of the main label Tm and the auxiliary label Ts of a printed example shown in FIG. 6. In FIG. 8, the auxiliary label Ts is affixed to the front face of a shelf 72 at the uppermost shelf of a bookshelf 71, and file binders 81 in which the main labels Tm are affixed on the spines are arranged and stored corresponding to the affixed positions of the auxiliary labels Ts respectively.

As mentioned above, since the cartridge 100 is selected appropriately, the installation interval of the RFID circuit elements To in the base tape 101 is substantially the same as a width W of the file binder 81, which is a use target of the RFID labels Tm, Ts (or in the case of a relatively close dimension, an extra portion may be cut away), and the auxiliary label Ts (main label Tm, too) is also formed with the length L substantially the same as the width W of the file binder 81. With this configuration, in the print Rs on the auxiliary label Ts affixed to the shelf 72, a region between the division lines 61 at the both ends shown by the arrow straight line 62 with an arrow at the both ends, that is, an affixation range in the entire length direction of the auxiliary label Ts shows the arrangement place "A-2" (second from the left on A shelf, indicating the uppermost shelf of the bookshelf). Incidentally, as the arrangement information, expiratory date information, time information and the like such as "till (dd/mm/20yy)" may be added to the arrangement place information. Also, if the width W of the file binder 81 and the length of the auxiliary label Ts are the same and they can be distinguishes by color of the tape or the like, the print of "A-1", "A-2" of the auxiliary label Ts may be omitted.

FIG. 9 is a view illustrating an example of a screen displayed on a display device 5*a* provided at the above-mentioned terminal 5 or the general-purpose computer 6 at an access (reading or writing) to the RFID tag information in the IC circuit part 151 of the RFID circuit element To by the above-mentioned label producing apparatus 2.

In FIG. 9, in this example, the type of the RFID label (represented by frequency of the wireless communication, label length and distinction between the main label Tm and the auxiliary label Ts in the illustrated example), print characters to be printed in correspondence with the RFID circuit element To (the print characters Rm of the main label Tm in the illustrated example), an access (reading or writing) ID, which is a tag ID specific to the RFID circuit element To, address of the article information stored in the database 50 provided at the information server 7, and destination address of the corresponding information in the route server 4 are displayed. When the label is produced, the label producing apparatus 2 is operated by operation of the terminal 5 or the general-purpose computer 6 and the print characters Rm, Rs are printed on the cover film 103, and the RFID tag information such as the target information stored in advance in the IC circuit part 151 of the RFID circuit element To is read out, as will be described later (or the writing ID and information such as article information and storage information are written in the IC circuit part 151).

Here, the most distinguished characteristic of the present disclosure is that the arrangement information such as the arrangement place of the file binder 81, which is an article to be arranged, is stored in the database 50 of the information server 7 and when the main label Tm to be affixed to the file binder 81 is produced, the arrangement information is taken out of the database 50 and presence of an empty space in the arrangement place and detailed correspondence with the arrangement place are made clear and the auxiliary label Ts is produced. The detail will be described below in order.

First, in the example of the present embodiment, configuration of the article to be arranged information table and the arrangement information table to be stored in the database 50 will be described.

FIG. 10 is a conceptual diagram illustrating an example of the article to be arranged information table to be stored in the database 50. In FIG. 10, the article to be arranged information table is configured in a table format in which the attribute data is stored in correspondence with the file binders 81, which area plurality of articles to be arranged, respectively. The attribute data to be stored is constituted by a file ID set for each file binder 81, a file name, a date of creation, a person who created it, availability of disclosure, and an arrangement place (other than them, file material contents may be included). The file ID is information which can identify the file binder 81 in the system, which is uniquely generated at new registration and set to an individual file binder 81.

FIG. 11 is a conceptual diagram illustrating an example of the arrangement information table to be stored in the database 50. In FIG. 11, the arrangement information table is constituted in the table format in which arrangement data is stored in correspondence with each shelf in a single bookshelf (this example has three shelves of A shelf to C shelf), respectively, and the arrangement data is constituted by the entire length of each shelf from A shelf to C shelf, the number of file binders 81 whose arrangement place is set to each shelf, the file ID of the file binder 81 whose arrangement place is set, the total length of the widths W of the file binders 81 whose arrangement places are set, and an available length (=entire length−width total length). The arrangement information tables are stored in the database 50 in correspondence with the plurality of bookshelves, and though not shown in detail, the corresponding arrangement information table can be selected based on the attribute data relating to each bookshelf.

FIG. 12 is a flowchart illustrating a control procedure executed by the control circuit 30 of the label producing apparatus 2. In FIG. 12, when an instruction signal to produce an RFID label is input from the terminal 5 or the like, this flow is started.

First, at Step S5, printing contents of the main label Tm (The text "Patent-related file 2" in the example shown in FIG. 6) based on operation by the operator of the terminal 5 or the like is input through the input/output interface 31, and at the subsequent Step S10, based on the printing contents input at Step S5, printing data to be printed on the back face of the cover film 103 of the main label Tm is created.

Then, the routine goes to Step S15, where the attribute data of the file binder 81, which is the article to be arranged based on the operation by the operator of the terminal 5 and the like, is input through the input/output interface 31, and at the subsequent Step S20, based on the attribute data input at Step S15, writing data which is tag information to be written in the RFID circuit element To of the main label Tm is created.

Then, the routine goes to Step S25, where the width W (standard length) of the file binder 81 based on the operation by the operator of the terminal 5 or the like is input through the input/output interface 31. The cartridge 100 is supposed to be replaced by the cartridge 100 provided with the base tape 101 on which the RFID circuit elements To are arranged with the same interval as the width W of the file binder 81 in advance.

Then, the routine goes to Step S30, where based on the selection input by the operator of the terminal 5 or the like, it is determined whether or not the arrangement place of the file binder 81 is to be automatically searched from the arrangement information table of the database 50. If selection of the automatic search was made by the operator, the determination is satisfied, and the routine goes to Step S35.

At Step S35, the arrangement information tables of all the bookshelves applicable to the attribute data of the file binder 81 input at Step S15 are selected from the database 50 and all the available length data of each shelf in those arrangement information tables is acquired.

Next, the routine goes to Step S40, and among the available length data acquired at the above Step S35, it is determined if the available length data larger (longer) than the width W of the file binder 81 input at Step S25 exists or not. If there is no available length data larger than the width W of the file binder 81, the determination is not satisfied, it is considered that there is no shelf on which the file binder 81 can be arranged in all the bookshelves applicable to the attribute data of the file binder 81, which is the article to be arranged this time, a display signal is output to the display device of the terminal 5 at Step S45 to perform an error display and then, this flow is finished.

On the other hand, at the determination at Step S40, if there is available length data larger than the width W of the file binder 81, the determination is satisfied, and the routine goes to Step S50. At Step S50, all the shelves in the bookshelf with the available length data larger than the width W of the file binder 81 are acquired, a display signal is output to the display device 5*a* of the terminal 5 and the shelves are displayed.

Then, the routine goes to Step S55, where the shelf of the bookshelf operated and selected by the operator via the terminal 5 or the like is selected according to the display at Step S50, and the routine goes to Step S75. It may be so configured that only one shelf of the bookshelf automatically selected at Step S50 is displayed and only a confirmation operation signal by the operator via the terminal 5 or the like on whether the shelf of the bookshelf is appropriate is input for the display. In this way, the arrangement place is automatically allocated from the shelves of the bookshelf stored in the database 50, and the auxiliary label Ts is produced based on this, which further reduces operation burden on the operator and improves convenience.

On the other hand, at the determination at Step S30, when selection was made not to perform automatic search, the determination is not satisfied, that is, it is considered that the shelf to arrange the file binder 81 is to be designated manually, and the routine goes to Step S60.

At Step S60, the desired shelf of the bookshelf based on the designation operation by the operator of the terminal 5 or the like is input through the input/output interface 31, the arrangement information table of the designated bookshelf is selected from the database 50 at the subsequent Step S65, and the available length data of the designated shelf in the arrangement information table is acquired.

Next, the routine goes to Step S70, where it is determined whether or not the available length data acquired at Step S65 is larger than the width W of the file binder 81 input at Step S25. If the width W of the file binder 81 is larger than the available length data, the determination is not satisfied, that is, it is considered that the file binder 81, which is the article to be arranged this time, can not be arranged at the designated shelf, the routine returns to Step S60, and the same procedure is repeated. On the other hand, if the width W of the file binder 81 is smaller than the available length data, the determination is satisfied, and the routine goes to Step S75.

At Step S75, an access is made to the database 50, where data registration and update are carried out. Specifically, the file ID newly created in the article to be arranged information table and the attribute data of the file binder 81 input at Step S15 are newly registered. Also, in the arrangement information table corresponding to the bookshelf selected and designated at the Step S55 or Step S60, update is made so that the data of the number of files corresponding to the selected and designated shelf is incremented by 1, the above newly created file ID is added to the data of the file ID, the width W of the file binder 81 input at Step S25 is added to the data of the width total data and the available length is subtracted by the same width W. Note that the update processing can be practiced by information server 7 based on a instruction from label producing apparatus 2.

Then, the routine goes to Step S100A, where the main label Tm is produced by label production processing using the printing data created at Step S10 and the tag writing data created at Step S20.

Then, the routine goes to Step S80, based on the arrangement data corresponding to the shelf of the bookshelf selected and designated by the operator input at the Step S55 or Step S60, the printing data to be printed on the back face of the cover film 103 of the auxiliary label Ts ("A-2" in the example shown in FIG. 6) is created (created from the shelf and the subsequent number of data on the number of files in the arrangement information), and the writing data to be written in the RFID circuit element To of the auxiliary label Ts is created at the subsequent Step S85 based on the same arrangement data.

Next, the routine goes to Step S100B, where using the printing data created at the Step S80 and the tag writing data created at the Step S85, the auxiliary label Ts is created by the label production processing, and this flow is finished.

FIG. 13 is a flowchart illustrating a detailed procedure of the label producing apparatus executed by the control circuit 30 of the label producing apparatus 2 at Step S100A and Step S100B in FIG. 12, respectively.

In FIG. 13, first at step S105, a control signal is output to the cartridge shaft drive circuit 24 so as to rotate and drive the pressure roller 107 and the ribbon take-up roller 106 by the driving force of the motor 23 to drive cartridge shaft. Also, a control signal is output to the tape-feeding-roller motor 28 via the tape-feeding-roller drive circuit 29 so as to rotate and drive the feeding roller 17. Moreover, the printing data is output to the print-head drive circuit 25, and the print head 10 is electrified.

By the above procedure, the base tape 101 is fed out of the first roll 102 and supplied to the pressure roller 107, while the cover film 103 is fed out of the second roll 104, the base tape 101 and the cover film 103 are bonded together by the rollers 107 and 109 to be the tag label tape 110 with print and fed in the direction outside the label producing apparatus 2. Also at this time, the ink ribbon is fed out of the ribbon-supply-side roll 111, and the print Rm (or Rs) is printed on the predetermined print area R in the cover film 103.

Next, the routine goes to Step S110, where it is determined whether or not the base tape 101 (in other words, the tag label tape 110 with print) has been fed by a predetermined amount (a feeding distance by which the RFID circuit element To can reach the feeding guide 19, for example). The feeding distance determination at this time can be made only by detecting an appropriate identification mark provided on the base tape 101 with a separately provided known tape sensor. When the base tape 101 has been fed by the predetermined amount, the determination is satisfied, and the routine goes to Step S115.

At Step S115, the writing data created at the above-mentioned Step S20 in FIG. 12 (or created at Step S85) is written to the RFID circuit element To via the device antenna 14. Specifically, a writing command to write the desired data in the IC circuit part 151 is output to the signal processing circuit 22. Based on that, a writing signal is created at the signal processing circuit 22 as RFID tag information including the tag ID (identification information) and transmitted to the RFID circuit element To via the transmitting portion 32 of the radio frequency circuit 21 and the antenna 14, and the information is written in the memory part 157.

Next, the routine goes to Step S120, where it is checked that all the printing to be made on the printing area R of the cover film 103 has been completed and then, the routine goes to Step S125.

Then, at Step S125, it is determined if the base tape 101 (in other words, the tag label tape 110 with print) has been further fed by a predetermined amount or not. The feeding distance determination at this time can be also made only by detecting the marking by a tape sensor as in the above-mentioned Step S110. When the determination is satisfied, a portion corresponding to the upstream-side end portion in the feeding direction of the label T in the tag label tape 110 with print (scheduled cutting position) matches the position of the cutter 15, and the routine goes to the subsequent Step S130.

At Step S130, a control signal is output to the cartridge shaft drive circuit 24 and the tape-feeding-roller drive circuit 29 so as to stop the driving of the motor 23 to drive cartridge shaft and the tape-feeding-roller motor 28, and rotation of the pressure roller 107 and the feeding roller 17 is stopped. As a result, feeding of the base tape 101, the cover film 103, and the tag label tape 110 with print is stopped.

After that, a control signal is output to the solenoid drive circuit 27 at Step S135 so as to drive the solenoid 26, and cutting of the tag label tape 110 with print is performed by the cutter 15. As mentioned above, the end portion in the upstream side in the feeding direction of the tag label tape 110 with print matches the position of the cutter 15 at this time, and by this cutting by the cutter 15, the RFID label Tm (or Ts) is produced.

After that, the routine goes to Step S140, where a control signal is output to the tape-feeding-roller drive circuit 29, driving of the tape-feeding-roller motor 28 is resumed, and the feeding roller 17 is rotated. With this operation, the feeding by the feeding roller 17 is resumed, and the RFID label Tm (or Ts) created at the above-mentioned Step S135 is fed toward the carry-out exit 16 and discharged.

In the present embodiment configured as above, using the tag label tape 110 with print in which the arrangement information of the file binder 81 (arrangement place in this example) is formed by the print head 10 on the cover film 103, the auxiliary label Ts for arranging the file binder 81 is produced. At this time, the arrangement data which can create the arrangement place of each file binder 81 is stored and held in the database 50, and in the procedure at Step S35 and Step S60 in the flow of FIG. 12, the database 50 is accessed and the arrangement place for the file binder 81 relating to the label to be produced is acquired, and the print head 10 forms the acquired arrangement place on the cover film 103.

The arrangement place of the file binder 81 is written into a database in this way, and the auxiliary label Ts is produced based on the access to the database 50. With this arrangement, it is possible to produce a label based on a clear correspondence between the file binder 81 and its arrangement place or the like in detail after presence of an available arrangement place and conformance/nonconformance of the file binder 81 to the arrangement place is checked. As a result, the file binder 81, which is the article to be arranged, can be managed accurately and efficiently.

Particularly in the present embodiment, the main label Tm on which the file name of the file binder 81 is printed can be produced along with the auxiliary label Ts for arranging the file binder 81 using the common cover film 103. On the auxiliary label Ts, by printing not only the arrangement place but also an image of the article to be arranged, for example, the correspondence between the article to be arranged and the arrangement place is visually clarified. In this case, the image to be printed on the auxiliary label Ts can be easily taken in from a catalog photo or the like. Also, printing the same figure instead of the arrangement place on the corresponding main label Tm and the auxiliary label Ts, collation between the file binder 81 and its arrangement place can be visually clarified. With this configuration, after the file binder 81 is taken out, the place for return can be easily identified at the time of return. Also, the attribute data such as the file name (name of the article to be arranged) of the file binder 81 can be printed on the auxiliary label Ts.

Also, particularly in the present embodiment, a plurality of shelves in a bookshelf is acquired from the arrangement information table stored in the database 50 as arrangement place candidates for the file binder 81 by the procedure at Step S35 in the flow of FIG. 12, and they are displayed in the procedure at Step S50 in the flow of FIG. 12. By selection made of any of the arrangement places by the operator in response to the display, the arrangement place corresponding to the operation signal is printed on the cover film 103. By displaying arrangement place candidates in this way, it is only necessary for the operator to make a choice from among them, which reduces a burden of manual operation input and can improve convenience.

Also, particularly in the present embodiment, even though the arrangement places are sorted in advance by the attribute data such as the file name of the file binder 81, the shelf of the bookshelf according to the attribute data is acquired from the database 50 by the procedure at Step S35 in the flow of FIG. 12, and the auxiliary label Ts can be produced rapidly and smoothly.

Also, particularly in the present embodiment, in the procedure at Step S115 of FIG. 13 that the main label Tm as the RFID label is produced using the base tape 101 provided with the RFID circuit element To and executed at Step S100A in FIG. 12, the attribute data such as the file name (or may be the tag ID linked with that) relating to the file binder 81 is written in the IC circuit part 151. With the arrangement, by reading data written in the IC circuit part 151 of the RFID circuit element To of the main label Tm using an RFID tag reader connected to the communication line 3 and accessing the database 50 so as to acquire the file name, identification information or the like of the file binder 81 in the end, for example, the file binder 81 can be managed using the RFID tag information system. Moreover, the main label Tm is produced as the RFID label similarly to the above and by writing information corresponding to the shelf of the bookshelf, which is the arrangement place (it may be the tag identification information or its linked information/correlated information) in the procedure at Step S115 of FIG. 13 executed at Step S100B of FIG. 12, the information such as the arrangement place for arranging the file binder 81 can be also managed using the RFID tag information system. In this case, a second auxiliary label Ts 2 provided with the information of the same arrangement place as that of the above-mentioned auxiliary label Ts is further produced for a bookshelf 91 having a door 92 as shown in FIG. 14 and by affixing the label to the front of the door 92, the information of the arrangement place can be read out of the second auxiliary label Ts 2 via wireless communication even if the door 92 is closed.

In the above, the main label Tm and the auxiliary label Ts are configured as the RFID label provided with the RFID circuit element To, respectively, but it is not necessary to provide the RFID circuit element To for both only if the correspondence of the main label Tm and the auxiliary label Ts is sufficiently clear (only if the print as mentioned above is made, for example). If the RFID circuit element To is not provided at the main label Tm, for example, the procedure at Step S20 in the flow of FIG. 12 is not needed any more, while if the RFID circuit element To is not provided at the auxiliary label Ts, the procedure at Step S85 in the flow of FIG. 12 is not needed any more. Moreover, if the RFID circuit element To is not provided to either of the main label Tm and the auxiliary label Ts, the procedure at Step S110 and Step S115 in the flow of FIG. 13 is not needed, either.

Moreover, the length of the auxiliary label Ts is not necessarily required to match the width W of the file binder 81, and the auxiliary label Ts can be formed using a blank at production of the main label Tm having the RFID circuit element To. In this case, the print head 10 prints the file name (identification information) of the file binder 81 on a print area (print area for the main label Tm) at the position corresponding to the RFID circuit element To of the main label Tm in the cover film 103 (or base tape made of a thermo-sensitive tape) and also prints the arrangement place on a blank area at the tip end or the rear end side in the tape feeding direction than the print area on which the file name is printed. As a result, a portion other than the print area of the file name corresponding to the transmitting/receiving contents can be effectively utilized without being wasted as a blank, and both the main label Tm and the auxiliary label Ts can be produced by the single label production procedure. The two labels Tm and Ts may be formed integrally by a half-cut line where the cover film 103, the adhesive layer 101a, the base film 101b and the adhesive layer 101c other than the separation sheet 101d are cut (in other words, the half-cut line is formed between the two labels Tm and Ts).

In the above, an example is shown that writing/reading or printing of the RFID tag information is carried out for the base tape 101 being moved, but not limited to that, the base tape 101 or the like is stopped at a predetermined position (and moreover, reading/writing may be held by a predetermined feeding guide) for carrying out the above printing or reading/writing.

Also, in the above, an example was described that the tag label tape 110 with print in which printing and accessing (reading or writing) to the RFID circuit element To have been finished is cut by the cutter 15 and the RFID labels Tm and Ts are produced, but not limited to that. That is, when a label mount (so called die-cut label) separated to a predetermined size corresponding to the label in advance is continuously arranged on a tape fed out of a roll, after the tape is discharged from the carry-out exit 16, only the label mount (on which the RFID circuit element To which has been accessed is provided and corresponding print has been made) is separated from the tape so as to produce the RFID labels Tm and Ts without cutting by the cutter 15, and the present disclosure can be also applied to this type.

Also, in the above, print is made on the cover film 103 separate from the base tape 101 provided with the RFID circuit element To and they are bonded together, but not limited to that, the present disclosure can be applied to a method for carrying out printing on a print-receiving layer using a tag tape provided with the print-receiving layer (a thermal layer made of a thermo-sensitive material which develops color by heat and can form print, a transferred layer constructed by a material to be transferred which can form print by thermal transfer from an ink ribbon, or an image receiving layer as the print-receiving layer constructed by an image receiving material which can form print by applying ink) (non-bonding type). In the case, a printing by print head 10 is practiced to the print-receiving layer of the tag tape.

Moreover, in the above, an example is described that the base tape 101 is wound around the reel member to constitute a roll, the roll is arranged in the cartridge 100 and the base tape 101 is fed out, but not limited to that. For example, it may be so configured that a lengthy flat sheet state or strip state tape or sheet on which at least one RFID circuit element To is arranged (including those in which the tape wound around a roll is fed out and then, cut to an appropriate length to be formed) is stacked in a predetermined housing portion (flatly stacked in a tray state article, for example) to be made into a cartridge, and this cartridge is attached to a cartridge holder on the side of the label producing apparatus 2 to be transferred and fed from the housing portion for printing and writing so as to produce a RFID label.

Moreover, a configuration that the roll is detachably and directly attached to the side of the label producing apparatus 2 or a configuration that the lengthy flat sheet state or strip state tape or sheet is transferred by a predetermined feeder mechanism one by one from outside the label producing apparatus 2 and supplied into the label producing apparatus 2 is possible, and moreover, not limited to the cartridge 100 that can be detachably attached to the side of the main body of the label producing apparatus 2 but the first roll 102 may be provided as an installed type or an integral type, not detachable from the apparatus body. The same effect can be also acquired in this case.

Other than those mentioned above, methods of the embodiments and each variation may be combined as appropriate for use.

Though not specifically exemplified, the present disclosure should be put into practice with various changes made in a range not departing from its gist.

What is claimed is:

1. A label producing apparatus comprising:
   a feeding device that feeds a label base supplied from a label base housing body for housing said label base capable of supply;
   an affixed position information acquisition portion that accesses a database storing and holding a plural pieces of affixed position information relating to a plurality of positions for affixing labels capable of being an arrangement place of an article to be arranged and acquires the plural pieces of affixed position information;
   a display signal generating portion that generates a display signal for displaying the affixed position information in a display device, acquired by said affixed position information acquisition portion;
   an information forming device that forms the affixed position information selected from a plural pieces of said affixed position information for said label base fed by said feeding device based on an operation signal inputted according to display of said display device so as to produce a label for affixed position information; and
   a printing device for an article to be arranged that prints identification information of said article to be arranged relating to said arrangement place corresponding to said affixed position information acquired by said affixed position information acquisition portion on said label base and produces a label for an article to be arranged affixed to said article to be arranged.

2. The label producing apparatus according to claim 1, wherein:
   a display signal generating portion generates said display signal for displaying said affixed position information corresponding to arrangement place information in said display device, said arrangement place information automatically allocated by said database as an arrangement place for said article to be arranged.

3. The label producing apparatus according to claim 1, wherein:
   said affixed position information acquisition portion acquires said affixed position information according to the attribute of said article to be arranged from said database.

4. The label producing apparatus according to claim 1, wherein:
   said information forming device includes an affixed position printing device that prints said affixed position information acquired by said affixed position information acquisition portion for said label base fed by said feeding device.

5. The label producing apparatus according to claim 4, wherein:
said feeding device feeds a tag medium provided with an RFID circuit element having an IC circuit part for storing information and an antenna for transmitting/receiving information as said label base; and
said label producing apparatus further comprises:
a communicating device that performs transmitting/receiving information with said RFID circuit element via wireless communication; and
a first writing control portion that writes first information relating to said article to be arranged in said IC circuit part via the communicating device and produces an RFID label for an article to be arranged provided with said first information as said label for an article to be arranged.

6. The label producing apparatus according to claim 5, wherein:
said printing device for an article to be arranged prints identification information of said article to be arranged corresponding to transmitting/receiving contents by said communicating device on a first print area provided at a position corresponding to said RFID circuit element in said tag medium or a print-receiving medium to be bonded thereto; and
said affixed position printing device prints said affixed position information acquired by said affixed position information acquisition portion on a second print area located on an end portion side along the feeding direction than said first print area in said tag medium or said print-receiving medium as said label base.

7. The label producing apparatus according to claim 5, further comprising a second writing control portion that writes second information relating to said affixed position information to said IC circuit part of RFID circuit element different from said RFID circuit element of said label for an article to be arranged via said communicating device and produces an RFID label for affixed position information provided with said second information as said label for affixed position information.

8. A label producing apparatus comprising:
a feeding device that feeds a tag medium provided with an RFID circuit element having an IC circuit part for storing information and an antenna for transmitting/receiving information as a label base;
an affixed position information acquisition portion that accesses database storing and holding a plural pieces of affixed position information relating to a plurality of positions for affixing labels capable of being an arrangement place of an article to be arranged and acquires the plural pieces of affixed position information;
a display signal generating portion that generates a display signal for displaying the affixed position information in a display device, acquired by said affixed position information acquisition portion;
an information forming device that forms the affixed position information selected from a plural pieces of said affixed position information for said tag medium fed by said feeding device based on an operation signal inputted according to display of said display device so as to produce a label for affixed position information;
a printing device for an article to be arranged that prints identification information of said article to be arranged relating to said arrangement place corresponding to said affixed position information acquired by said affixed position information acquisition portion on said tag medium or a print-receiving medium to be bonded thereto and produces a label for an article to be arranged affixed to said article to be arranged;
a communicating device that performs transmitting/receiving information with said RFID circuit element via wireless communication; and
a first writing controller that writes first information relating to said article to be arranged in said IC circuit part via the communicating device and produces an RFID label for an article to be arranged provided with said first information as said label for an article to be arranged.

9. The label producing apparatus according to claim 8, further comprising a second writing controller that writes second information relating to said affixed position information to said IC circuit part of RFID circuit element different from said RFID circuit element of said label for an article to be arranged via said communicating device and produces an RFID label for affixed position information provided with said second information as said label for affixed position information.

10. An information system comprising:
a label for an article to be arranged affixed to said article to be arranged;
a label for affixed position information affixed to positions for affixing labels capable of being an arrangement place of said article to be arranged;
a database storing and holding a plural pieces of affixed position information relating to a plurality of said positions for affixing labels;
an information processing device that reads and writes information to and from said database; and
a label producing apparatus including:
a feeding device that feeds a label base supplied from a label base housing body for housing said label base capable of supply;
an affixed position information acquisition portion that accesses said database to acquire a plural pieces of said affixed position information;
a display signal generating portion that generates a display signal for displaying the affixed position information in a display device, acquired by said affixed position information acquisition portion;
an information forming device that forms the affixed position information selected from a plural pieces of said affixed position information for said label base fed by said feeding device based on an operation signal inputted according to display of said display device and produces a label for affixed position information, and
a printing device for an article to be arranged that prints identification information of said article to be arranged relating to said arrangement place corresponding to said affixed position information acquired by said affixed position information acquisition portion on said label base and produces said label for an article to be arranged, wherein:
at least one of said information processing device or said label producing apparatus includes an update processing portion that performs update processing of said affixed position information of said database according to the production of said label for arrangement information by said information forming device.

11. The information system according to claim 10, wherein:
said update processing portion performs update processing in such a manner that said affixed position information is associated with identification information and attribute information of said corresponding article to be arranged.

* * * * *